United States Patent Office 3,439,001

Patented Apr. 15, 1969

3,439,001

EPOXIDATION USING ETHYLBENZENE HYDROPEROXIDE WITH ALKALI OR ADSORBENT TREATMENT OF RECYCLE ETHYLBENZENE

Melvyn Pell, East Paterson, and Ernest Ian Korchak, Hackensack, N.J., assignors to Halcon International, Inc., a corporation of Delaware No Drawing. Filed Oct. 1, 1965, Ser. No. 492,299
Int. Cl. C07d *1/06, 1/08*
U.S. Cl. 260—348.5 4 Claims

ABSTRACT OF THE DISCLOSURE

This invention relates to the epoxidation of olefins using ethylbenzene hydroperoxide, and specifically to the separation and recycle of unreacted ethylbenzene with the recycle ethylbenzene being subjected to an alkali or adsorbent treatment.

The present invention is concerned with the epoxidation of olefinically unsaturated compounds using ethylbenzene hydroperoxide as epoxidizing agent. In particular, the present invention is concerned with a process which involves the oxidation of ethylbenzene to form ethylbenzene hydroperoxide, the epoxidation of an olefin with the ethylbenzene hydroperoxide, the separation and recycle of unreacted ethylbenzene, and the treatment of the separated recycle ethylbenzene so as to improve the utility of this recycle ethylbenzene in subsequent epoxidations.

Important advances have recently been made in the epoxidation of olefinically unsaturated materials. Particularly, it has been found that ethylbenzene hydroperoxide can successfully be employed in the epoxidation of such difficultly epoxidizable olefins as propylene. Through the use of appropriate catalysts such as compounds of molybdenum, extremely high selectivities and conversions in the epoxidation are achieved.

Continuous processes have been formulated wherein valuable materials such as propylene oxide and other oxirane compounds can be prepared in a convenient manner from inexpensive and readily available raw materials. These procedures have involved the oxidation of ethylbenzene with molecular oxygen with the formation of a reaction mixture containing ethylbenzene hydroperoxide. This oxidation reaction is a partial conversion reaction involving the reaction of not more than 50% and usually much less of the ethylbenzene per pass. The reaction mixture itself or after concentration of the hydroperoxide is employed in the epoxidation of an olefin such as propylene. During the epoxidation, the ethylbenzene hydroperoxide is converted to alpha phenyl ethanol.

The epoxidation reaction mixture is customarily separated by distillation techniques and there are separately recovered the oxirane product, the alpha phenyl ethanol coproduct, and unreacted ethylbenzene. It is, of course, necessary economically to recycle the ethylbenzene to the oxidation step for the formation of additional quantities of ethylbenzene hydroperoxide.

The use of the recycle ethylbenzene, however, has caused certain difficulties in the subsequent epoxidation reactions. Specifically, it has been found that the use of the recycle ethylbenzene quite unexpectedly gives rise to rather severe problems of residue formation during the epoxidation step. The residue which is formed represents material which is lost in continuous operation thus resulting in inefficiencies of operation. Also, it has been found that the epoxidation selectively suffers as a result of the use of the recycle ethylbenzene.

It is an object of the present invention to provide an improved process for the epoxidation of olefins employing ethylbenzene hydroperoxide as epoxidizing agent.

It is a particular object of the invention to provide a process wherein ethylbenzene hydroperoxide is employed in the epoxidation of olefins, wherein unreacted ethylbenzene is recycled and reused in the process while avoiding the deleterious effects previously associated with the use of this recycle ethylbenzene.

Other objects will be apparent from the following description of the invention.

It has now been found that the deleterious effects in the epoxidation reaction associated with the use of recycle ethylbenzene can be alleviated or completely avoided by subjecting the ethylbenzene to either treatment with aqueous alkali solution or to treatment with solid adsorbent which is not strongly acidic prior to recycle and reuse in the process. In accordance with the present invention, ethylbenzene is oxidized with molecular oxygen to produce a solution containing ethylbenzene hydroperoxide in unreacted ethylbenzene. Techniques which are of a generally known type are employed in this oxidation reaction. The conversion of ethylbenzene per pass should be less than about 50% and preferably less than about 25%. The presence of metal ions which catalyze decomposition of the formed hydroperoxide should be avoided as will be understood by those skilled in the art. Temperatures ranging from about 100° C. to 180° C. and preferably 120° C. to 160° C. can be employed while suitable pressures are generally 0 p.s.i.g. to 200 p.s.i.g. and preferably 0 p.s.i.g. to 50 p.s.i.g.

The ethylbenzene hydroperoxide thusly formed in solution in ethylbenzene is then employed in the epoxidation of an olefin. The preferred olefin is propylene although the invention encompasses the epoxidation of olefine broadly.

Epoxidation temperatures which can be employed can vary quite widely depending upon the reactivity and other characteristics of the particular system. Temperatures broadly in the range of about —20° to 200° C., desirably 0 o 150° C., and preferably 50° to 120° C. can be employed. The epoxidation reaction is carried out at pressure conditions sufficient to maintain a liquid phase. Although sub-atmospheric pressures can be employed, pressures usually in the range of about atmospheric to about 1,000 p.s.i.g. are most desirable.

The epoxidation catalyst includes compounds of the following: Ti, V, Cr, Cb, Se, Zr, Nb, Mo, Te, Ta, W, Re, U. These may be characterized as forming peracids or as hydroxylation catalysts. By far, the preferred catalysts are compounds of V, W, Mo, Ti and Se.

The amount of metal in solution used as catalyst in the epoxidation process can be varied widely, although as a rule it is desirable to use at least 0.00001 mol and preferably 0.0001 to 0.03 mol per mol of hydroperoxide present. Amounts greater than about 0.1 mol seem to give no advantage over smaller amounts, although amounts up to 1 mol or more per mol of hydroperoxide can be employed. The catalysts can be reused in the reaction after removal of the reaction products therefrom. The molybdenum compounds include the molybdenum organic salts, the oxides such as $Mo_2O_3$, $MoO_2$, $MoO_3$, molybdic acid, the molybdenum chlorides and oxychlorides, molybdenum fluoride, phosphate, sulfide, and the like. Heteropolyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will, to some extent depend on the particular reaction medium employed, a suitable soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such, for examples, as acetoacetonates may also be used. Specific and preferred catalytic compounds of this type for use in the invention are the naphthenates and carbonyls of molybdenum, vanadium, tungsten, titanium, rhenium, tantalum, niobium, and selenium. Alkoxy compounds such as tetrabutyl titanate and tetra alkyl titanates are very useful.

As to the substrate, olefinically unsaturated materials which are epoxidized in accordance with the invention include substituted and unsubstituted aliphatic and alicyclic olefins which may be hydrocarbon or esters or alcohols or ketones or ethers or the like. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octenes, the dodecenes, cyclohexene, the methyl cyclohexenes, butadiene, styrene, methyl styrene, vinyl toluene, vinylcyclohexane, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methy oleate, methyl vinyl ketone, allyl chloride, and the like. In general, all olefinic materials epoxidized by methods previously employed can be epoxidized in accordance with this process including olefinically unsaturated polymers.

The lower olefins having about 3 or 4 carbon atoms in an aliphatic chain are especially advantageously epoxidized by this process.

The class of olefins commonly termed alpha olefins or primary olefins are epoxidized in the particularly efficient manner by this process. It is known to the art that these primary olefins, e.g., propylene, butene-1, decene-1, hexadecene-1, etc. are much more difficulty epoxidized than other forms of olefins, excluding only ethylene. Other forms of olefins which are much more easily epoxidized are substituted olefins, alkenes with internal unsaturation, cycloalkenes and the like. For example, it has been found that cyclohexene is easily epoxidized with all of the metals cited in this disclosure.

In the oxidation of the substrate, the ratio of substrate to organic peroxy compounds can vary over a wide range. Generally, mol ratios of olefinic groups in the substrates to hydroperoxide broadly in the range of 0.5:1 to 100:1, desirably 1:1 to 20:1 and preferably 2:1 to 10:1 are employed.

The concentration of hydroperoxides in the substrate oxidation reaction mixture at the beginning of the reaction will normally be one percent or more although lesser concentrations will be effective and can be used.

The substrate oxidation reaction can be carried out in the presence of a solvent, and in fact, it is generally desirable that one be used. In general, aqueous solvents are not contemplated. Among the suitable substances are hydrocarbons, which may be aliphatic, naphthenic or aromatic.

Basic substances can be employed in the epoxidation including alkali metal compounds or alkaline earth metal compounds. Particularly preferred are the compounds of sodium, potassium, lithium, calcium, magnesium, rubidium, cesium, strontium and barium. Compounds which are employed are those which most preferably are soluble in the reaction medium. However, insoluble forms can be employed and are effective when dispersed in the reaction medium. Organic acid compounds such as a metal acetate, naphthenate, sterate, octoate, butyrate, and the like can be employed. Additionally, inorganic salts such as Na carbonate, Mg carbonate, trisodium phosphate, and the like can also be employed. Particularly preferred species of metal salts include sodium naphthenate, potassium stearate, magnesium carbonate, and the like. Hydroxides and oxides of alkali and alkali earth metal compounds can be used. Examples are NaOH, MgO, CaO, $Ca(OH)_2$, KOH, and the like. Alkoxides, e.g., Na ethylate, K cumylate, Na phenate etc. can be used. Amides such as $NaNH_2$ can be used as can quaternary ammonium salts. In general, any compound of alkali or alkali earth metals giving a basic reaction in water can be used.

The basic compound is employed during the epoxidation reaction in amount of .05 to 10 moles/mol of epoxidation catalyst desirably .25 to 3.0 and preferably .50 to 1.50. It has been found that as a result of the incorporation of the basic compound in the reaction system, significantly improved efficiencies in the utilization of the organic hydroperoxides in the epoxidation is achieved.

The epoxidation effluent containing unreacted olefin, oxirane product, alpha phenyl ethanol product, and unreacted ethylbenzene is separated by a series of distillation steps. The oxirane compound is recovered as a product of the process. The alpha phenyl ethanol can itself comprise a product or this can be dehydrated to coproduct styrene or alternatively converted back to ethylbenzene for reuse in the process. The unreacted olefin is recovered and recycled to the epoxidation step.

In accordance with the present invention, the ethylbenzene recovered from the oxidation is subected to a treatment prior to the recycle of this material to the ethylbenzene hydroperoxide forming step. In one embodiment of the invention, this recovered ethylbenzene is treated with an aqueous alkali solution. This embodiment involves thoroughly admixing the recycle ethylbenzene with the aqueous solution, decanting ethylbenzene from the aqueous phase, and finally washing the decanted ethylbenzene in order to remove residual traces of base.

Preferably, the aqueous basic solution is an aqueous alkali metal hydroxide solution. However, aqueous alkali metal carbonate solutions and the like can also be used. Generally aqueous solutions of sodium hydroxide, potassium hydroxide, sodium carbonate, and the like are preferred.

In another embodiment of the invention, the recovered ethylbenzene from the epoxidation effluent is passed through a bed of particulate solid adsorbent which is not highly acidic. It has been discovered that treatment with the adsorbent is also effective so that the ethylbenzene can be efficiently reused in the formation of additional quantities of oxirane compound.

Adsorbents which are used in the invention are neutral, basic, or weakly acidic. The strongly acidic materials such as silica gel, silica-alumina, and the like are not suitable although these materials can be base treated as with alkali metal hydroxide or carbonate and rendered useful in the present invention.

Molecular sieves having a pore diameter of about 6 to 13 Angstroms can be used. Activated carbon, various clays, aluminas, and the like are also useful. The adsorbent treatment is preferably carried out at 20 to 100° C.

The caustic treating step involves the use of aqueous alkali solution having an alkali content by weight of about 1% to 50%. Suitably, amounts of the aqueous solution in the range of 5% to 100% of the ethylbenzene are appropriate. Treatment temperatures broadly in the range of 10° C. to 150° C. and preferably 20° C. to 100° C. can be employed.

After the treatment with aqueous base or with the adsorbent by a combination of the two, the ethylbenzene is returned to the oxidation step for the formation of additional quantities of ethylbenzene hydroperoxide. It has been found that as a result of the above treatment, the ethylbenzene can be converted to ethylbenzene hydroperoxide which can be successfully employed in olefin epoxidations without the formation of high quantities of deteterious byproduct residues in the epoxidation step.

The treatment of the recycle ethylbenzene removes impurities which are contained in the recycle stream and which if not removed promote residue formation. Surprisingly, it has been found that similar treatment with highly acidic aqueous solutions or solid adsorbents is not similarly effective in impurity removal.

The following examples illustrate the invention.

Examples

In a series of runs ethylbenzene is oxidized with air at 140° C. and at a pressure of 20 p.s.i.a. to produce a reaction mixture containing ethylbenzene hydroperoxide in a concentration of about 0.90 gram mols per kilogram.

The oxidation effluents are employed in the epoxidation of propylene at 110° C., at a propylene to hydroperoxide mol ratio of 5.0 using molybdenum naphthenate and sodium naphthenate catalyst system, the molybdenum concentration being 100 p.p.m. and the sodium to molybdenum atomic ratio being 0.5.

Each epoxidation reaction effluent is separated by distillation into an unreacted propylene fraction, a propylene oxide fraction, an unreacted ethylbenzene fraction and a coproduct alpha phenyl ethanol fraction. Distillation conditions are those described in Example 1 of copending application Ser. No. 473,647, filed July 21, 1965.

Run 1 represents the results achieved with commercial ethylbenzene (no recycle ethylbenzene).

In run 2 the ethylbenzene is recycle ethylbenzene from a previous epoxidation at the above conditions, the recycle ethylbenzene not being treated.

Run 3 is similar to run 2 except that in accordance with the invention the recycle ethylbenzene is treated at 25° C. with 10 parts of 10 wt. percent aqueous sodium hydroxide and with four successive washes each with 10 parts distilled water per 100 parts ethylbenzene.

Run 4 is similar to run 2 except that in accordance with the invention the recycle ethylbenzene is passed at 80° C. through a bed of 13 Angstrom molecular sieves (Linde 13X).

The following table shows the results achieved:

| Run | Ethylbenzene oxidation | | Propylene epoxidation | |
|---|---|---|---|---|
| | Oxidation time, min. | Concentration of byproduct acid, gram-equiv./gram | Residue formation, gram residue per 100 gram EBHP | Molar selectivity to PO, percent |
| 1 | 255 | 0.0076 | 4.3 | 70 |
| 2 | 310 | 0.0195 | 10.3 | 66 |
| 3 | 205 | 0.0087 | 4.4 | 69 |
| 4 | 205 | 0.0070 | 5.1 | 68 |

By way of comparison where sulfuric acid is used in place of the caustic or where silica gel or silica alumina is used in place of the molecular sieves, the advantages of this invention are not achieved.

What is claimed is:

1. In a process for the production of oxirane compounds which consists of reacting molecular oxygen with ethylbenzene to form ethylbenzene hydroperoxide, reacting an olefin with said ethylbenzene hydroperoxide to form the oxirane compound, and recovering unreacted ethylbenzene and recycling said recovered ethylbenzene to said oxidation, the improvement which comprises treating the recycle ethylbenzene at a temperature of 10 to 150° C. with 5 to 100% of an aqueous alkali solution having an alkali content by weight of 1 to 50%, and water washing the alkali treated ethylbenzene to remove residual alkali prior to reuse in the said oxidation step.

2. In a process for the production of oxirane compounds which consists of reacting molecular oxygen with ethylbenzene to form ethylbenzene hydroperoxide, reacting an olefin with said ethylbenzene hydroperoxide to form the oxirane compound and recovering unreated ethylbenzene and recycling said recovered ethylbenzene to said oxidation, the improvement which comprises treating the recycle ethylbenzene at a temperature of 20 to 100° C. with a solid adsorbent selected from the group consisting of molecular sieves having a pore diameter of 6 to 13 Angstroms, activated carbon, clay, alumina, and alkali metal hydroxide or carbonate treated silica gel and silica alumina which is not highly acidic prior to reuse in the said oxidation step.

3. The process of claim 1 wherein said olefin is propylene.

4. The process of claim 2 wherein said olefin is propylene.

References Cited

Neth. Appl.; No. 6,500, 118; July 8, 1965; Halcon International, Inc., pp. 1–16.

HENRY R. JILES, *Primary Examiner.*

S. WINTERS, *Assistant Examiner.*